United States Patent [19]
Mülhaupt et al.

[11] Patent Number: 5,480,922
[45] Date of Patent: Jan. 2, 1996

[54] PLASTICIZED CELLULOSE ACETATE, PROCESS FOR ITS PRODUCTION AND ITS USE FOR PRODUCING FILAMENTS

[75] Inventors: Rolf Mülhaupt, Freiburg; Joachim Schätzle, Kenzingen; Holger Warth, Freiburg, all of Germany

[73] Assignee: Rhone-Poulenc Rhodia Aktiengesellschaft, Freiburg, Germany

[21] Appl. No.: 281,416

[22] Filed: Jul. 27, 1994

[30] Foreign Application Priority Data

Jul. 28, 1993 [DE] Germany .................. 43 25 352.0

[51] Int. Cl.$^6$ ................ C08L 1/12; C08J 3/18; C08B 3/22; D01F 2/30
[52] U.S. Cl. .............. 524/41; 536/69; 527/300; 264/176.1; 264/177.1; 264/211; 106/176; 106/180; 106/196; 106/198; 106/173.1
[58] Field of Search ............... 524/41; 536/69; 527/300; 264/165, 176.1, 177.1, 211; 106/163.1, 169, 173.1, 176, 180, 196, 198

[56] References Cited

U.S. PATENT DOCUMENTS 3,922,239  11/1975  Koleske et al. ............... 527/300
4,529,788  7/1985  Asami et al. .................. 527/300

*Primary Examiner*—Nathan M. Nutter
*Attorney, Agent, or Firm*—Bucknam and Archer

[57] ABSTRACT

A plasticized cellulose acetate is described with a content of a modified cellulose acetate A comprising a grafted oligomer of a cyclic ester, in particular in the form of ε-caprolactone, which comprises additionally a plasticizing agent in the form of an oligomer B of a cyclic ester, and the terminal carboxyl group of the oligomer is esterified with an alcohol or an alcohol derivative having at least one free hydroxyl group, with a boiling point of at least approximately 120° C. and a melting point of no more than approximately 180° C. and the ratio of weight of component A to B is represented by the formula (I)

$$0.3 \leq A/(A+B) \leq 0.95 \qquad (I).$$

This plasticized cellulose acetate can be produced advantageously for example when an oligomer B in the form of the reaction product of a cyclic ester, in particular in the form of ε-caprolactone, and a monofunctional and/or polyfunctional alcohol and/or an alcohol derivative comprising at least one free hydroxyl group, is reacted in the melt in the presence of a catalyst with a cellulose acetate comprising hydroxyl groups. This process is economical. Relative to known products, the product of this process exhibits a lower melting point and can be used for the production of filaments by spinning from the melt.

22 Claims, No Drawings

PLASTICIZED CELLULOSE ACETATE, PROCESS FOR ITS PRODUCTION AND ITS USE FOR PRODUCING FILAMENTS

FIELD OF THE INVENTION

The invention relates to a plasticized cellulose acetate having a content of a modified cellulose acetate A, which comprises a grafted oligomer of a cyclic ester, in particular in the form of ε-caprolactone, a process for its production, and it use in the production of filaments.

BACKGROUND OF THE INVENTION

U.S. Pat. No. 3,922,239 describes a mixture of cellulose esters or ethers which are mixed with polymeric cyclic esters, such as for example the oligomer of ε-caprolactone. This substance is said to be thermoplastic. It was found that the components of the mixture do not posses satisfactory compatibility. This is shown by the fact that during the thermoplastic processing no homogeneous melt is obtained. To some extent even a de-mixing can be observed during the processing.

GR-A-2 152 944 describes plasticized cellulose acetates. These are obtained in the reaction of a cellulose acetate having a free hydroxyl group, with a cyclic ester, in particular in the form of ε-caprolactone, in the presence of a catalyst. The ratio of weights of the cellulose acetate to the cyclic ester is said to be between 1/99 and 95/5 and the polymerization temperatures are said to be between 120° and 230° C. The reaction is preferably carried out in dry nitrogen as a protective gas. The reaction mixture can comprise an organic solvent containing no active hydrogen in the molecule and showing sufficient compatibility with the cellulose acetate and the cyclic ester, such as for example xylene. Possible catalysts are in particular organic acids, inorganic acids, alkali metals, such as sodium and potassium, tertiary amines, alkyl aluminum and its derivatives, such as triethyl aluminum, alkoxy titanium compounds, such as tetrabutyl titanate, organometallic compounds such as stannous octoate and dibutyl tin dilaurate, and metal halogenides, such as tin chloride. The quantity of cyclic ester which is to be reacted with the hydroxyl group-containing cellulose acetate, is preferably between 0.5 and 4.0 mol units per anhydroglucose unit of the cellulose acetate. The melting temperature of the plasticized cellulose acetate is reduced through an "inner" plastification. The decomposition temperature is simultaneously raised. This permits the plasticized cellulose acetate to be spun into filaments in advantageous manner in the melt. These are used inter alia in the field of textiles and for the production of cigarette filter tows.

The process and the plasticized cellulose acetates described in GB-A-2 152 944 are in need of improvement. The use of caprolactone-grafted cellulose acetate, corresponding to the component A without component B (as will be described in the following) requires a high content of caprolactone in order to ensure processing out of the melt. This is relatively expensive. Moreover, it would be desirable to lower the melting point of the plasticized cellulose acetate even further in order to utilize to an increased degree the advantages of spinning from the melt compared to dry spinning. The dry spinning process is afflicted with the disadvantages that the solvents used must be recovered which is economically as well as ecologically disadvantageous.

Prior art, as published in the following publications, does not go beyond that of the above discussed GB-A-2 152 944: WO 92/20738 describes degradable cellulose esters comprising a hydrophilic degradation activator. Under high ambient moisture this diffuses into the cellulose ester and makes it degradable. The degradation activator can inter alia be a lactone. It can also be considered as a plasticizing agent for the cellulose ester. Conventional plasticizing agents can additionally be used. U.S. Pat. No. 4,529,788 deals with a process for the production of graft polymerizate in which a cyclic ester is subjected to a catalyzed ring-splitting polymerization in the presence of a cellulose derivative. The graft polymerizate has high transparency, good film-forming properties and high solubility. Derwent Abstract 86-242456/37 of J 61171719 relates to polyurethanes of improved miscibility with other polymerizates with organic diisocyanates being converted with polyester polyols, which are obtained through the ring-splitting polymerization of lactones in the presence of sorbitol. The polymerizates inter alia show improved resistance against heat and solvents and miscibility with other polymerizates. Derwent Abstract 86/106500 of J 60238317 describes alkyd resins for coating wood, metal, plastic materials and the like, with these containing a graft polymerizate which can be obtained by splitting the ring of cyclic esters in the presence of hydroxy cellulose derivatives. The alkyd resins show inter alia improved hardness and weather resistance and are, for example, component parts of paints for metals and wood.

SUMMARY OF THE INVENTION

The object of the invention is to modify the initially described plasticized cellulose acetate in such a way that its melting point is lowered further, and to suggest especially suitable processes for the production of plasticized cellulose acetate in such a way that their economy of use is improved.

The above stated object is solved so that the plasticized cellulose acetate additionally comprises an external plasticizing agent B in the form of an oligomer of a cyclic ester, with the terminal carboxyl group of the oligomer being esterified with an alcohol and/or an alcohol derivative, comprising at least one free hydroxyl group, having a boiling point of at least approximately 120° and a melting point of no more than 180° C. and the ratio of weight of component A and B being given by the formula (1)

$$0.3 \leq A/(A+B) \leq 0.95 \qquad (1).$$

It is especially preferred if the ratio of weight $A/(A+B)$ is at least 0.5 to 0.9, in particular 0.7 to 0.9. If the value falls below the lower limit value of 0.3 specified in the above formula (I), i.e. the component of oligomer B is raised, the plasticizing range decreases so far that the product is soft at room temperature. Consequently, sensible use of the product is no longer possible. If the upper limit value of 0.95 is exceeded, thermoplastic processing is impossible or is made difficult in a way that a practical realization of the invention is no longer possible. At a value of approximately 0.5 sufficient stability values are achieved as well as favorably low processing temperatures. An advantageous limit value of approximately 0.8 leads to a higher processing temperature: this value offers the advantage that the product has good mechanical strength and can be produced economically.

With respect to selecting the suitable alcohol or alcohol derivative with at least one free hydroxyl group, the invention is subject to the restriction that its boiling point should be at least approximately 120° C., in particular at least approximately 140° C., and its melting point should not be higher than approximately 180° C., in particular not higher than approximately 160° C. The alcohol can be a monohydric alcohol or a polyhydric one, and in particular dihydric or trihydric. This alcohol can a primary, secondary or tertiary alcohol. It can be saturated, but also unsaturated, in particular having a double bond, as long as it does not have any influence on the intended effects. For example, an allyl alcohol would be suitable. The alcohol can be aliphatic, aromatic, alicyclic or also heterocyclic. Among the monohydric alcohols are especially suited: pentanol, hexanol. octanol as well as the dodecyl or lauryl alcohol, in each instance preferred in their n-configuration but also in the form of the possible isomers, a "wax alcohol", such as n-hexadecyl or cetyl, ceryl or myricyl alcohol. Preferred are alcohols with 2 to 6 hydroxyl groups. In the foreground are dihydric alcohols, in particular the 1,2-diols (glycols), such as ethylene glycol and propylene glycol or other oligo ethylene glycols, in particular diethylene glycol, triethylene glycol and tetraethylene glycol, and the trihydric alcohols, in particular 1,2,3-propane triol (glycerin), 1,2,4 butane triol and 1,2,6-hexane triol. Of the tetrahydric alcohols are preferred erythritol, of the pentahydric alcohols arabitol, adonitol, and xylitol, and of the hexahydric alcohols sorbitol, mannitol, and dulcitol. Of the aromatic alcohols are in particular preferred benzyl alcohol, diphenyl methanol, and triphenyl methanol, of the alicyclic alcohols in particular the monohydric alcohols cyclobutanol, cyclopentanol, cyclohexanol, and cycloheptanol, but also dihydric alicyclic alcohols, such as in particular cyclohexane diol.

Derivatives of the above alcohols are also suitable, for example in alkoxylated form, such as in particular in methoxylated and ethoxylated form. For example a hydroxyl group of the above listed dihydric alcohols and also of the trihydric alcohols could be substituted by an alkoxy group, in particular a methoxy or ethoxy group. The addressed alkoxy group has preferably 1 to 4 carbon atoms. Consequently, the formation of ether bonds occurs. Moreover, an ester bond could also be created so that that one or several hydroxyl groups are esterified with a suitable carboxylic acid and acetic acid is in particular an option for this. In each case, in the esterification as well as also the etherification one hydroxyl group of the alcohol must be available for the chemical reactions, which will be explained in further detail in the following, with the cyclic ester. The alcohol derivatives are also subject to the above listed margin conditions with respect to minimum boiling point or maximum melting point.

In order to achieve special effects, mixtures of the above listed alcohols or alcohol derivatives can be used, in particular in the form of a mixture comprising glycerin and sorbitol with this mixture comprising 5 to 95 percent by mass, in particular 65 to 85 percent by mass of sorbitol.

In the selection of the cyclic ester the present invention also offers a wide range. They can be simple cyclic esters and also cyclic double esters of hydroxy carboxylic acids. The simple cyclic esters are the "lactones" and the cyclic double esters the "lactides". The especially suitable cyclic esters comprise in the ring 3 to 6 carbon atoms and one or two oxygen atoms and can be represented by the following formulas (I) to (VII):

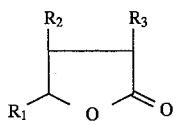
(I)

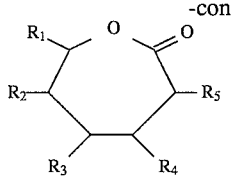
(II)

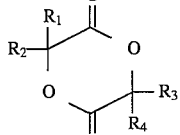
(III)

(IV)

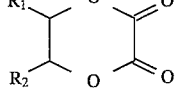
(V)

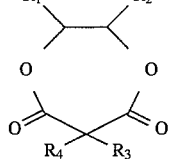
(VI)

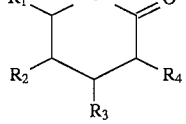
(VII)

In formulas (I) to (VII) the residues $R_1$ to $R_5$ can indicate, in each instance independently of one another: hydrogen, a lower alkyl group with 1 to 10 carbon atoms, in particular 1 to 4 carbon atoms, such as the methyl, ethyl, n-propyl, i-propyl, and the i-butyl group as well as the various isomers thereof, a cycloalkyl group with 3 to 6 carbon atoms, such as in particular the cyclopropyl, cyclobutyl, cyclopentyl as well as cyclohexyl group, an aralkyl group with 7 to 18 carbon atoms, in particular the benzyl and phenethyl group, an alkylaryl group with 7 to 18 carbon atoms, in particular the tolyl group, as well as a heterocyclic group with 2 to 5 carbon atoms, in particular those in whose heterocyclic ring are at least one oxygen, sulfur or N atom, such as in particular the radicals of oxiran, tetrahydrofuran, dioxane as well as pyran, an aryl group in the form of a phenyl or naphthyl residue and the aryl residues can be substituted by a $C_1$ to $C_4$ alkyl residue.

The ratio of weight of alcohol or alcohol derivative to the particular ester is subject to wide variations. Preferred is the ratio of weight between approximately 90:10 and 10:90, in particular approximately 70:30 to 40:60, which applies especially for the combination glycerin and/or sorbitol with ε-caprolactone.

In the plasticized cellulose acetate according to the invention, in addition non-converted cellulose acetate can also be present. This fraction of the non-converted cellulose acetate is preferably under approximately 10 percent by mass relative to the two above addressed components A and B. In the event that an excess of alcohol, in particular glycerin, is used and this is not bound to an ε-caprolactone, this is not harmful for the effects intended with the invention. When a portion of the alcohol is coupled to ε-caprolactone, compatibility with the plasticized cellulose acetate is conveyed onto the unbound remaining alcohol. Within the scope of the invention it is also possible to incorporate into the material various additives, such as for example pigments, such as titanium dioxide, to achieve particular effects.

In the selection of the cellulose acetate starting material to be used according to the invention, the present invention is also not subject to significant limitations. In general, the degree of substitution (DS) can be between approximately 1.2 and 2.95, in particular between approximately 1.9 and 2.9 and, especially preferred between approximately 1.9 and 2.7. The degree of polymerization (DP) is here in general between approximately 150 and 300, in particular between approximately 170 and 260.

The plasticized cellulose acetate according to the invention can be produced according to the processes A) and B) described in the following.

Process A) according to the invention is characterized in that an oligomer B in the form of the conversion product of a cyclic ester, in particular in the form of ε-caprolactone, and of a monofunctional and/or polyfunctional alcohol and/or of an alcohol derivative comprising at least one free hydroxyl group, is converted in the presence of a catalyst in the melt with a cellulose acetate comprising a hydroxyl group. It is preferred that the cellulose acetate comprising hydroxyl groups is reacted with an oligomer B, which is obtained through the reaction of ε-caprolactone and glycerin and/or sorbitol.

The ratio of weight of cellulose acetate comprising hydroxyl groups to oligomer B is preferably approximately 70:30 to 30:70. Furthermore, it is preferred that the conversion in process A) in the melt is carried out for approximately 2 minutes to 6 hours. The melt is preferably set to a temperature of 190° to 220° C. The ratio of weight of the preferred glycerin and/or sorbitol to caprolactone is preferably approximately 90:10 to 10:90, in particular approximately 70:30 to 40:60.

Process B) according to the invention is characterized in that a cellulose acetate comprising hydroxyl groups, is converted in situ with a cyclic ester, in particular ε-caprolactone, and a monofunctional and/or polyfunctional alcohol and/or an alcohol derivative comprising at least one free hydroxyl group, in the presence of a catalyst in the melt. It is herein preferred that the cellulose acetate comprising hydroxyl groups is converted with glycerin and/or sorbitol and ε-caprolactone. The temperature of the melt is preferably approximately 160° to 210° C. It is preferred that the ratio of weight of cellulose acetate comprising hydroxyl groups to the starting mixture comprising the preferred glycerin and/or sorbitol and ε-caprolactone is between approximately 90:10 and 30:70. Furthermore, the ratio of weight of glycerin and/or sorbitol to ε-caprolactone is preferred to be approximately 90:10 to 10:90, in particular 70:30 to 40:60.

To both of the above described processes A) and B) are ascribed, as shown, considerable common features. This applies for example also for the use of the alcohols or of the alcohol derivatives which have already been described above.

In the selection of the catalysts for carrying out the process according to the invention according to embodiments A) and B) the invention also is not subject to any relevant limitation, In particular catalysts are possible which have already initially been addressed in the explanation of prior art according to GB-A-2 152 944. Preferred are organometallic compounds, such as dibutyl tin dilaurate, dibutyl tin oxide, zinc acetyl acetonate, zinc acetate dihydrate, titanium(IV) butylate and titanium(IV) propylate. It is preferred in the process embodiments A) and B) that the catalyst concentration in the conversion medium is approximately 0.1 to 1 percent by mass.

In the following the two processes according to the invention will be explained in further detail with emphasis on especially preferred embodiments, according to which ε-caprolactone and glycerin form the plasticizing component. To the extent to which it is readily apparent, these explanations will also apply correspondingly for other cyclic esters and other alcohols or alcohol derivatives which have already been discussed above:

The advantage of process B) resides inter alia in that the cellulose acetate is pre-swelled by the mixture comprising the alcohol or alcohol derivative and the cyclic ester, to which the function of a plasticizing agent can be ascribed. This applies in particular to the use of glycerin and ε-caprolactone. Compared to process A) the ε-caprolactone component, relative to the mixture comprising ε-caprolactone and glycerin, can be decreased for example to approximately 25 percent by mass. In process B) the ε-caprolactone competes with the hydroxyl groups of the cellulose acetate and of the glycerin.

If the ε-caprolactone is oligomerized with glycerin in the presence of cellulose acetate comprising hydroxyl groups according to process B), problems of compatibility can be eliminated and the reaction time for the production of the mixture and simultaneously the requirement for ε-caprolactone can be markedly reduced. For example, cellulose 2.5 acetate were converted with 25 percent by mass of ε-caprolactone and 25 percent by mass of glycerin for 2 hours at 200° C. in the presence of 0.5% dibutyl tin dilaurate, 100 ppm Irganox 1010 (function: antioxidation agent) and 500 ppm Irgafos 168 (function: auxiliary processing agent). The residual content of ε-caprolactone or glycerin was less than 1.5 percent by mass. Analysis by means of gel permeation chromatography has shown that, apart from grafted cellulose 2.5 acetate, oligocaprolactone B was also formed.

In a preferred embodiment of the process according to the invention according to embodiment A), first, ε-caprolactone and glycerin were converted in the manner which will will described later in Example 3, to form a trihydroxy-terminated oligocaprolactone.

This oligocaparolactone B is converted in the melt with the cellulose acetate comprising hydroxy groups. The following process takes primarily place: coupling of the oligocaprolactone component to the cellulose acetate chain through the reaction with a free hydroxyl group or reesterification reaction at an acetyl group. Furthermore, caprolactone remaining after the production of the oligocaprolactone B, can be grafted in the melt in situ onto the cellulose acetate or remaining glycerin. Consequently, expensive reprocessing and purification of the oligocaprolactone B is not necessary.

In process A) the ratio of weight of the preferred starting materials in the form of glycerin and ε-caprolactone is of importance for the plasticized cellulose acetate obtained therewith. In order to examine the influence of oligocaprolactone chains of different length for the properties of the plasticized cellulose acetate targeted according to the invention, the ratio of weight of glycerin to ε-caprolactone was varied between 1:1 and 1:9. This corresponds to a molar ratio glycerin/ε-caprolactone of 1:1.24 or 1:7.3. The mean molar mass (mean weight) of the oligocaprolactone B is 5100 or 8000 (GPC calibrated to polystyrene). In the attempt to alloy the oligocaprolactone B with cellulose acetate it was found that at a high ε-caprolactone fraction (90 percent by mass) even with relatively long reaction times in the melt with cellulose acetate complete thorough mixing could not be achieved. The percentage component of the ε-caprolactone in the mixture glycerin/ε-caprolactone was varied between approximately 75 to 90 percent by mass in the production of the oligocaprolactone B. The higher molecular trihydroxy-terminated oligocaprolactones were for example not miscible with cellulose 2.5 acetate. Oligocaprolactones B based on caprolactone with approximately 66 percent by mass ε-caprolactone are especially favorable plasticizing agents for cellulose acetates. In contrast to insitu grafting with ε-caprolactone, the melting viscosities and reaction times for the process are markedly higher.

The reaction temperature is of importance in the implementation of process A). For example, at a temperature below 190° C. for the above addressed oligocaprolactones B no melting occurs. At a reaction temperature of 180° C. even after 6 hours the complete mixing of the components cannot be achieved so that no melt is obtained. The melt reaction is preferably carried out at more than approximately 200° C., in particular at approximately 210° C. to 220° C.

The residual content of monomeric caprolactone and glycerin can be decreased to negligible values (0.1 percent by mass caprolactone, 0.2 percent by mass glycerin) in both process embodiments by applying a vacuum at the end of the reaction.

Further investigations have shown that the increase of the cellulose acetate component in both process variants leads to an increase of the viscosity during the processing. The softening and melting point decrease with increasing component of oligocaprolactone B, while the decomposition points increase. The molecular weight (Mw) decreases with decreasing cellulose acetate component. With increasing trihydroxy-terminated oligocaprolactone component the softness of the sample increases. Tensile stress, stretch, modulus E and breaking elongation decrease. An increased cellulose acetate component shifts the properties in the direction toward pure cellulose acetate, however, the influence of the caprolactone components can still be clearly observed.

The catalyst concentration has an influence on the plasticized cellulose acetates obtained according to the process A). For example the viscosity maximum in the kneader is reached faster with increasing catalyst concentration, for example in the case of a concentration of 0.1 percent by mass DBTDL (dibutyl tin dilaurate) after 115 minutes, at 0.5 percent by mass after 95 minutes and at 1 percent by mass after 85 minutes. It was found that an increase of the catalyst concentration causes a marked increase of the reaction rate.

In comparison to the in-situ grafting with ε-caprolactone and glycerin (process B) it takes a longer time (1 hour) until at the advantageous melting temperatures a melt is generated which effects the desired alloying.

The advantages resulting from the invention can be seen in particular therein that a plasticized cellulose acetate can be obtained whose melting point, relative to the products of prior art, is lower and it is possible in the production of this product to proceed in an economical manner. The plasticized cellulose acetates are especially suited for the production of filaments by spinning from the melt.

The invention will be explained in further detail in the following in conjunction with various examples as well as comparison examples and test reports of the physical properties of various tested substances:

1. Comparison Example (in-situ Grafting of
Cellulose Acetate Comprising Hydroxyl Groups
with ε-caprolactone)

In the IKAVISC measuring kneader under the conditions of Table 1 a mixture comprising the antioxidation agent Irganox 1010 (tradename) (1000 ppm) (chem. name: 2,6 di tert. butyl-1-hydroxyphenyl) propionic acid ester (propionate) of pentaerythritol, available from Ciba Geigy), the auxiliary processing agent Irgafos 168 (tradename) (500 ppm) (chemical name: phenol-2-4-bis(1,1-dimethylethyl)-phosphite(3:1), available from Ciba Geigy) and a cellulose acetate comprising residual hydroxyl groups (DS: 2.5 and DP: 220) in vacuo (40 mbars) were heated to 100° C. This mixture is heated in an $N_2$ atmosphere to the reaction temperature. After carefully adding the ε-caprolactone and the catalyst (dibutyl ditin [SIC:tin] dilaurate/DBTDL) the reaction is started and for the specified length of time the mixture is kneaded under a slight $N_2$ excess pressure. The viscosity is registered automatically. After switching off the thermostat, kneading is continued in order to cool the mixture to 160° C. Subsequently, a vacuum (40 mbars) is applied down to a temperature of 110° C. in order to draw off nonconverted monomer. The raw product is removed while still warm. A hard substance is obtained which is crushed in a hammer mill. The individual process parameters are summarized in the following Tables I and II.

TABLE I

| | (Process parameters in the in-situ grafting) | | | | | | |
|---|---|---|---|---|---|---|---|
| Sample | Cellulose acetate (mmol) (g) | -caprolactone (mol) (g) | DBTDL (%) (g) | Irganox 1010 (ppm) (g) | Irgafos 169 (ppm) (g) | Duration*) (h) | Temperature (°C.) |
| 1 | 1.7 | 0.9 | 0.5 | 1000 | 500 | 6.5 | 180 |
|   | 100 | 100 | 0.9 | 0.22 | 0.1 | | |
| 2 | 1.7 | 0.9 | 0.5 | 1000 | 500 | 3.5 | 180 |
|   | 100 | 100 | 0.91 | 0.2 | 0.1 | | |
| 3 | 1.7 | 0.9 | 0.5 | 1000 | 500 | 4.25 | 180 |
|   | 100 | 100 | 0.91 | 0.2 | 0.1 | | |
| 4 | 1.7 | 0.9 | 0.5 | 1000 | 500 | 2.5 | 180 |
|   | 100 | 100 | 0.91 | 0.2 | 0.1 | | |
| 5 | 1.7 | 0.9 | 0.5 | 1000 | 500 | 6.5 | 180 |
|   | 100 | 100 | 0.91 | 0.2 | 0.1 | | |

TABLE I-continued

| | | (Properties) | | | | |
|---|---|---|---|---|---|---|
| Sample | Melting Temp. (°C.) | Decomposition Temp. (°C.) | Tensile Stress (MPa) | Stretch (%) | Modulus E (MPa) | Energy (mJ) |
| 1 | 220 | 269 | 19.2 | 83 | 441 | 167.1 |
| 2 | 224 | >250 | 18.9 | 92 | 361 | 149.3 |
| 3 | 236 | >250 | 20.6 | 110 | 414 | 165.2 |
| 4 | 236 | >250 | 14.4 | 163 | 214 | 47.0 |
| 5 | 248 | >250 | 17.8 | 111 | 425 | 75.0 |

Note
*)The duration is composed of the reaction time proper and the cooling phase of 30 minutes.

Example 1 (Alloy of Cellulose 2.5 Acetate with Modified Glycerins)

Into the measuring kneader the quantities specified in the following Table II of the trihydroxy-terminated oligomer B (Sample 12 according to Table IV, produced according to Example 3) are placed. The substance is heated in a $N_2$ atmosphere to the stated temperature. After adding cellulose 2.5 acetate, Irganox 1010, Irgafos 168 and DBTDL, the measuring curves are automatically recorded.

After the stated reaction time a vacuum (40 mbars) is applied until a temperature of 110° C. is reached. The raw product is removed while still warm. A hard substance is obtained which is crushed in a hammer mill. The individual parameters are listed in the following Table II.

the catalyst, the reaction is started and during the specified time kneaded under slight $N_2$ excess pressure. After switching off the thermostat, kneading is continued until the temperature falls to 160° C. Subsequently a vacuum (40 mbars) is applied until the temperature reaches 110° C. in order to draw off the non-converted monomer. The raw product is removed while still warm. A hard substance is obtained which is crushed in a hammer mill. The reaction parameters are summarized in the following Table III.

TABLE II

| Sample | Cellulose acetate (mmol) (g) | Oligomer B (mol) (g) | DBTDL (%) (g) | Irganox 1010 (ppm) (g) | Irgafos 168 (ppm) (g) | Duration*) (h) | Temperature (°C.) |
|---|---|---|---|---|---|---|---|
| 6 | 1.7 | 0.31 | 0.5 | 1000 | 500 | 4.5 | 200 |
|   | 100 | 100 | 0.9 | 0.2 | 0.1 | | |
| 7 | 1.7 | 0.31 | 0.5 | 1000 | 500 | 2.5 | 200 |
|   | 100 | 100 | 0.9 | 0.2 | 0.1 | | |
| 8 | 2.38 | 0.19 | 0.5 | 1000 | 500 | 2.5 | 200 |
|   | 140 | 60 | 0.9 | 0.2 | 0.1 | | |
| 9 | 1.02 | 0.19 | 0.1 | 1000 | 500 | 2.5 | 200 |
|   | 60 | 60 | 0.1 | 0.12 | 0.06 | | |
| 10 | 1.02 | 0.19 | 1 | 1000 | 500 | 2.5 | 200 |
|   | 60 | 60 | 1.1 | 0.12 | 0.06 | | |

| | | (Properties) | | | | |
|---|---|---|---|---|---|---|
| Sample | Melting Temp. (°C.) | Decomposition Temp. (°C.) | Tensile Stress (MPa) | Stretch (%) | Modulus E (MPa) | Energy (mJ) |
| 6 | 208 | >272 | 7.9 | 40 | 261 | 553 |
| 7 | 214 | >272 | 12.3 | 17 | 407 | 300 |
| 8 | 210 | >272 | 27.5 | 62 | 738 | 2000 |
| 9 | 205 | >272 | 9.5 | 13 | 347 | 140 |
| 10 | 206 | >272 | 7.3 | 8 | 335 | 69 |

Note
*)The duration is composed of the reaction time proper and the cooling phase of 30 minutes.

Example 2 (Alloy of Cellulose 2.5 Acetate with ε-Caprolactone and Glycerin)

In the measuring kneader are mixed the quantities specified in Table III of the antioxidants Irganox 1010 (1000 ppm), processor Irgafos 168 (500 ppm) and cellulose 2.5 acetate and heated in vacuo (40 mbars) to 100° C. In a $N_2$ atmosphere heating to the reaction temperature takes place. After carefully adding the ε-caprolactone, the glycerin and

TABLE III

| Sample | Cellulose acetate (mmol) (g) | Caprolactone (mol) (g) | Glycerin (mol) (g) | DBTDL % (g) | Irganox 1010 (ppm) (g) | Irgafos 168 (ppm) (g) | Duration (h) | Temp. (°C.) |
|---|---|---|---|---|---|---|---|---|
| 11 | 1.7<br>100 | 0.16<br>50 | 0.69<br>50 | 0.5<br>0.9 | 1000<br>0.2 | 500<br>0.1 | 2 | 200 |

| | (Properties) | | | | | |
|---|---|---|---|---|---|---|
| Sample | Melting Temp. (°C.) | Decomposition Temp. (°C.) | Tensile Stress (MPa) | Stretch (%) | Modulus E (MPa) | Energy (mJ) |
| 11 | 209 | >272 | 11.4 | 190 | 78 | 1661 |

Example 3 (Production of the Oligomer B Based on Glycerin used According to Example 1

Glycerin is heated to 220° C. for 5 hours in the ratios specified in the following Table IV with ε-caprolactone and with 0.5 percent by mass DBTDL with the measuring stirrer. During the cooling period, the excess ε-caprolactone is removed by applying a vacuum (1 h). While still warm, the product is filled into storage containers in which it solidifies after a few hours to form a white-yellowish substance with a wax-like consistency.

TABLE IV

| Sample | Caprolactone (mol) (g) | Glycerin (mol) (g) | DBTDL (%) (g) | Temp. (°C.) | Duration (h) | Yield (%) |
|---|---|---|---|---|---|---|
| 11 | 125 (1.71) | 375 (3.3) | 2.81 (0.5) | 220 | 5 | 94 |

We claim:

1. A plasticized cellulose acetate which comprises a mixture of component A and component B, said component A being a modified cellulose acetate, said modified cellulose acetate being cellulose acetate grafted with an oligomer A1 of a cyclic ester, said cyclic ester being a lactone having 3 to 6 carbon atoms and one or two oxygen atoms in the ring, said component B being a plasticizing agent, said plasticizing agent being an oligomer B1 of said cyclic ester, said oligomer B1 having a terminal carboxyl group, said terminal carboxyl group being esterified with a member selected from the group consisting of a monohydroxy alcohol, a polyhydroxy alcohol and an alcohol derivative, said alcohol derivative being a polyhydroxy alcohol containing one or more free hydroxyl groups and one or more alkoxy groups, said monohydroxy alcohol, said polyhydroxy alcohol and said alcohol derivative each having a boiling point of at least 120° C. or a melting point up to 180° C., the ratio of weight of said component A and said component B being according to the formula (1)

$$0.3 \leq A/(A+B) \leq 0.95 \quad (1).$$

2. The plasticized cellulose acetate according to claim 1 wherein the boiling point of said monohydroxy alcohol, said polyhydroxy alcohol and said alcohol derivative is at least 140° C. and the melting point thereof is up to 160° C.

3. The plasticized cellulose acetate according to claim 1 wherein the ratio of weight A/(A+B) is 0.7 to 0.9.

4. The plasticized cellulose acetate according to claim 1 wherein said cellulose acetate has a degree of substitution between 1.2 and 2.95 and a degree of polymerization between 150 and 300.

5. The plasticized cellulose acetate according to claim 1 wherein said polyhydroxy alcohol is glycerin or sorbitol or a mixture thereof.

6. The plasticized cellulose acetate according to claim 1 wherein the ratio of weight of said monohydroxy alcohol, said polyhydroxy alcohol and said alcohol derivative to said lactone is between 70:30 and 40:60.

7. The plasticized cellulose acetate according to claim 5 wherein said lactone is ε-caprolactone.

8. The plasticized cellulose acetate according to claim 7 which has a melting point between 206° and 214° C.

9. The plasticized cellulose acetate according to claim 8 which has tensile strength between 7.3 and 27.5 MPA and a stretch between 8 and 62%.

10. A process for the production of a plasticized cellulose acetate which comprises a mixture of component A and a component B, said component A being a modified cellulose acetate, said modified cellulose acetate being cellulose acetate grafted with an oligomer A1 of a cyclic ester, said cyclic ester being a lactone having 3 to 6 carbon atoms and one or two oxygen atoms in the ring, said component B being a plasticizing agent, said plasticizing agent being an oligomer B1 of said cyclic ester, said oligomer B1 having a terminal carboxyl group, said terminal carboxyl group being esterified with a member selected from the group consisting of a monohydroxy alcohol, a polyhydroxy alcohol and an alcohol derivative, said alcohol derivative being a polyhydroxy alcohol containing one or more free hydroxyl groups and one or more alkoxy groups, said monohydroxy alcohol, said polyhydroxy alcohol and said alcohol derivative each having a boiling point of at least 120° C. or a melting point up to 180° C., the ratio of weight of said component A and said component B being according to the formula (1)

$$0.3 \leq A/(A+B) \leq 0.95 \quad (1)$$

and the process consists of the steps of:
1) reacting said lactone with a member selected from the group consisting of said monohydroxy alcohol, said polyhydroxy alcohol and said alcohol derivative whereby said component B is obtained and
2) reacting cellulose acetate containing hydroxyl groups with said component B in a ratio of 70:30 to 30:70 by weight in a melt at a temperature between 190° C. and 220° C. in the presence of a catalyst.

11. The process according to claim 10 wherein the amount of the catalyst in step 2) is 0.1 to 1% by weight.

12. The process according to claim 10 wherein said catalyst is dibutyl tin dilaurate, dibutyl tin oxide, zinc acetyl acetonate, zinc acetate dihydrate, titanium (IV) butylate or titanium (IV) propylate.

13. The process according to claim 10 wherein said cellulose acetate comprising hydroxyl groups is reacted with component B, said component B having been obtained by reaction of ε-caprolatone with glycerin or sorbitol or a mixture thereof.

14. The process according to claim 13 wherein glycerin and ε-caprolatone in step 1) are reacted in a molar ratio of 1:1.24 to 1:7.3 and said component B has mean molecular mass of 5100 or 8000.

15. The process according to claim 13 wherein in step 1) the ratio by weight of glycerin or sorbitol or mixtures thereof to ε-caprolatone is 70:30 to 40:60.

16. The process according to claim 10 wherein the reaction in step 2) is carried out in the melt for 2 minutes up to 6 hours.

17. A process for the production of a plasticized celluloseacetate which comprises a mixture of component A and a component B, said component A being a modified cellulose acetate, said modified cellulose acetate being cellulose acetate grafted with an oligomer A1 of a cyclic ester, said cyclic ester being a lactone having 3 to 6 carbon atoms and one or two oxygen atoms in the ring, said component B being a plasticizing agent, said plasticizing agent being an oligomer B1 of said cyclic ester, said oligomer B1 having a terminal carboxyl group, said terminal carboxyl group being esterified with a member selected from the group consisting of a monohydroxy alcohol, a polyhydroxy alcohol and an alcohol derivative, said alcohol derivative being a polyhydroxy alcohol containing one or more free hydroxyl groups and one or more alkoxy groups, said monohydroxy alcohol, said polyhydroxy alcohol and said alcohol derivative each having a boiling point of at least 120° C. or a melting point up to 180° C., the ratio of weight of said component A and said component B being according to the formula (1)

$$0.3 \leq A/(A+B) \leq 0.95 \qquad (1),$$

which consists of reacting a cellulose acetate containing hydroxyl groups with a degree of substitution of 1.2 to 2.95 with said lactone and a member selected from the group consisting of a monohydroxy alcohol, a polyhydroxy alcohol or alcohol derivative in a melt in situ at a temperature between 160° and 210° C. in the presence of a catalyst.

18. The process according to claim 17 wherein the catalyst is present in an amount of 0.1 to 1% by weight.

19. The process according to claim 17 wherein said catalyst is dibutyl tin dilaurate, dibutyl tin oxide, zinc acetyl acetonate, zinc acetate dihydrate, titanium (IV) butylate or titanium (IV) propylate.

20. The process according to claim 17 wherein said lactone is ε-caprolactone and said alcohol is glycerin or sorbitol or a mixture thereof.

21. The process according to claim 17 wherein the ratio by weight of glycerin or sorbitol or a mixture thereof to ε-caprolactone is 70:30 to 40:60.

22. The process according to claim 20 the ratio by weight of said cellulose acetate to the mixture consisting of glycerin or sorbitol and mixtures thereof and ε-caprolactone is 90:10 to 30:70.

* * * * *